United States Patent
Samara et al.

(10) Patent No.: US 9,946,963 B2
(45) Date of Patent: Apr. 17, 2018

(54) BARCODE VISUALIZATION IN AUGMENTED REALITY

(71) Applicant: LAYAR B.V., Amsterdam (NL)

(72) Inventors: Anatoliy Samara, Amsterdam (NL); Klaus Michael Hofmann, Amsterdam (NL); Dirk Groten, Amsterdam (NL)

(73) Assignee: LAYAR B.V., Amsterdam (NL)

( * ) Notice: Subject to any disclaimer, the term of this patent is extended or adjusted under 35 U.S.C. 154(b) by 0 days.

(21) Appl. No.: 13/781,845

(22) Filed: Mar. 1, 2013

(65) Prior Publication Data

US 2014/0247278 A1    Sep. 4, 2014

(51) Int. Cl.
  *G06T 1/20*   (2006.01)
  *G06K 17/00*  (2006.01)
  *G06T 11/00*  (2006.01)

(52) U.S. Cl.
  CPC .......... *G06K 17/0016* (2013.01); *G06T 11/00* (2013.01)

(58) Field of Classification Search
  CPC .............................. G06T 19/006; G06T 19/00
  USPC .................................................. 345/506, 633
  See application file for complete search history.

(56) References Cited

U.S. PATENT DOCUMENTS

| | | |
|---|---|---|
| 8,571,272 B2 | 10/2013 | Gokturk et al. |
| 9,141,714 B2 | 9/2015 | Boncyk et al. |
| 9,330,328 B2 | 5/2016 | Boncyk et al. |
| 9,396,589 B2 | 7/2016 | Soon-Shiong |
| 2010/0002909 A1 | 1/2010 | Lefevre |
| 2011/0134108 A1 | 6/2011 | Hertenstein |
| 2011/0254861 A1 | 10/2011 | Emura et al. |
| 2012/0019557 A1 | 1/2012 | Aronsson et al. |
| 2012/0027290 A1* | 2/2012 | Baheti et al. ................. 382/154 |
| 2012/0143361 A1* | 6/2012 | Kurabayashi et al. ......... 700/94 |
| 2012/0256956 A1 | 10/2012 | Kasahara |

(Continued)

FOREIGN PATENT DOCUMENTS

| | | |
|---|---|---|
| EP | 2378392 A1 | 10/2011 |
| EP | 2410490 A2 | 1/2012 |

(Continued)

OTHER PUBLICATIONS

Lee et al. (Multithreaded Hybrid Feature Tracking for Markerless Augmented Reality, vol. 15, No. 3, IEEE, May/Jun. 2009).*

(Continued)

*Primary Examiner* — Kyle Zhai
(74) *Attorney, Agent, or Firm* — Steven M. Koehler; Westman, Champlin & Koehler, P.A.

(57) ABSTRACT

Disclosed herein is an improved method for providing content associated with barcodes in augmented reality in addition or in combination with providing content associated with target objects in augmented reality. The improved method advantageously provides a augmented reality client that a user may use to view the respective content associated with barcodes and target objects while in camera view to improve usability. Advantageously, the user is not unexpectedly taken out of camera view to view the content associated with the barcode and the user experience provided is consistent between barcodes and target objects. Furthermore, the improved method integrates barcodes and a visualization of the barcode within augmented reality, without disrupting the real-time augmented reality experience.

20 Claims, 12 Drawing Sheets

(56) References Cited

U.S. PATENT DOCUMENTS

| | | | |
|---|---|---|---|
| 2012/0327117 A1 | 12/2012 | Weller et al. | |
| 2013/0026220 A1 | 1/2013 | Whelihan | |
| 2013/0063620 A1* | 3/2013 | Kim | G06K 7/10 348/222.1 |
| 2015/0070347 A1 | 3/2015 | Hofmann et al. | |

FOREIGN PATENT DOCUMENTS

| | | |
|---|---|---|
| EP | 2508975 A2 | 10/2012 |
| WO | 2010142896 A1 | 12/2010 |
| WO | 2013023706 A1 | 2/2013 |

OTHER PUBLICATIONS

Gordon et al. (What and Where: 3D Object Recognition with Accurate Pose, pp. 67-82, 2006, Springer Berlin Heidelberg).*

Lowe (Distinctive Image features from Scale-Invariance Keypoints, Jan. 5, 2004, international journal of computer vision).*

Extended European Search Report for corresponding EP Application No. 14157028, dated Apr. 7, 2015.

Hyoseok Yoon et al., "QR Code Date Representation for Mobile Augmented Reality", International AR Standards Meeting, Feb. 17, 2011, XP055178102.

Jian-Tung Wang et al., "Design and implementation of augmented reality system collaborating with QR code", Computer Symposium (ICD), 2010 International, IEEE, Piscataway, NJ, USA, Dec. 16, 2010, pp. 414-418, XP031847740.

International Search Report and Written Opinion from corresponding PCT/EP2011/064252, filed Aug. 18, 2011.

Henderson S et al: "Opportunistic Tangible User Interfaces for Augmented Reality", IEEE Transactions on Visualization and Computer Graphics, IEEE Service Center, Los Alamitos, CA, US, vol. 16, No. 1, Jan. 1, 2010, pp. 4-16.

Kiyoung Kim et al: "Marker-Less Tracking for Multi-layer Authoring in AR Books", Sep. 3, 2009, Entertainment Computing Â ICEC 2009, Springer Berlin Heidelberg, Berlin, Heidelberg, pp. 48-59.

Jing CH et al.: "An Improved Real-Time Natural Feature Tracking Algorithm for AR Application", Proceedings of the International Conference on Artificial Reality and Telexistence—Workshop, Nov. 1, 2006, pp. 119-124.

Nate Hagbi et al.: "Shape recognition and pose estimation for mobile augmented reality", Mixed and Augmented Reality, 2009. ISMAR 2009. 8th IEEE International Symposium on, IEEE, Piscataway, NJ, USA, Oct. 19, 2009, pp. 65-71.

David M. Chen et al.: "Streaming mobile augmented reality on mobile phones", Mixed and Augmented Reality, 2009. ISMAR 2009. 8th IEEE International Symposium on, IEEE, Piscataway, NJ, USA, Oct. 19, 2009, pp. 181-182.

Stephan Gammeter et al.: "Server-side object recognition and client-side object tracking for mobile augmented reality", Computer Vision and Pattern Recognition Workshops (CVPRW), 2010, IEEE Computer Society Conference on, IEEE, Piscataway, NJ, USA, Jun. 13, 2010, pp. 1-8.

Jaewon Ha et al.: "Real-time scalable recognition and tracking based on the server-client model for mobile Augmented Reality", VR Innovation (ISVRI), 2011, IEEE International Symposium on, IEEE, Mar. 19, 2011, pp. 267-272.

"New Release: Sony develops "SmartAR" Integrated Augmented Reality Technology", May 19, 2011.

* cited by examiner

BARCODE VISUALIZATION IN AUGMENTED REALITY

FIELD OF INVENTION

The disclosure generally relates to the field of augmented reality.

BACKGROUND

With the use of computer vision technologies and the increase of computing power, many user systems are now configured to clients that can quickly retrieve information or content related to an object in the real world simply by capturing and processing a digital image of the object. Instead of inputting a text query to obtain information about the object a user is looking at, the user is now able to point a camera of a mobile device to "scan" the object and retrieve relevant information about the object. These clients analyze the image frame(s) captured by the camera, and the relevant information is provided back to the user. For instance, the user system may detect and recognize that the object or an element in the real world is present in the image frame. The system then retrieves and display information that is contextually salient to the detected and recognized object.

SUMMARY

A method for providing visualization of text encoded in an optically machine-readable barcode to a user in augmented reality is disclosed herein. The ability to visualize the barcode allows the user to view the content associated with the barcode without disrupting the user experience in augmented reality. Said augmented reality is provided by a user system configured to render at least one augment for display, said at least one augment overlaying a view of the real world, e.g., over a barcode and/or a target object.

An image frame captured by a digital imaging part of the user system is received. From the image frame, the method detects whether the barcode is present in the image frame. If a barcode is detected, a first augment associated with the barcode is rendered for display. The displaying of the first augment is performed using a display part of the user system, and the rendering of the first augment for display is based on first pose parameters of the barcode. When the first augment is displayed to a user, the first augment appears in position with (and optionally overlays) the barcode. The ability to visualize the barcode is achieved.

The method further detects, from the image frame, whether a target object is present in the image frame, said target object not being a barcode. If a target object is detected, a second augment associated with the target object is rendered for display. The displaying of the second augment is performed using the display part of the user system, and the rendering of the second augment for display is based on second pose parameters of the target object. When the second augment is displayed to the user, the second augment appears in position with the target object. Optionally, the first augment overlays the target object.

Augments, in the context of the disclosure, are rendered to appear in position with, or in the same position as, the object or element in the real world of interest. If desired, also to appear with the same pose as the object or element. In some embodiments, the augments are rendered to appear at a fixed position relative to the object or element, thereby having the appearance to the user that the visual augment is "stuck" to the object or element. The visual augment thus appears to form an integral part of the object or element, even when the object or element may be located in different positions within the camera view (from frame to frame). As a result, the user experiences and is immersed in a hybrid environment that combines computer-generated augments and the real world.

Through the method, the user is provided with a consistent user experience no matter whether a target object is detected and/or a barcode is detected in the image frame. In both situations, a suitable augment showing content associated with the detected barcode or the target object is constructed and displayed in position with (and overlaying) the detected barcode or the target object (respectively). The consistency in the user experience advantageously reduces user frustration.

According to one aspect of the disclosure, the method further comprises decoding the barcode to determine the text embedded in the barcode, constructing the first augment based on at least part of the text, and estimating, from the image frame, the first pose parameters of the barcode. Advantageously in parallel and/or in series with the processing of the barcode, the method may extract query features from the image frame, wherein said query features suitable for object recognition and/or pose estimation, determine whether the query features matches reference features of the target object, wherein said reference features suitable for object recognition and/or pose estimation. Through the separate processes, barcodes and target objects may be detected and their pose parameters maybe estimated. If the target object is present or detected, the method constructs the second augment, wherein said second augment associated with the target object, and estimates, from the query features and the reference features, the second pose parameters of the target object.

According to one aspect of the disclosure, the first augment visually indicates an action performable by the user system based on the text. Advantageously, the augment displayed provides a way for the user to interact with the augment while in augmented reality. For instance, user input through an input part of the user system indicating a desire to perform the action may be received, and in response, the user system may execute the action on the user system based on the text.

According to one aspect of the disclosure, the first augment comprises at least a part of visual content indicated and/or directed by the text. For instance, constructing the first augment based on the text comprises retrieving visual content indicated and/or directed by the text, and generating the first augment based on at least a part of the visual content. Advantageously, any content that is referred to by the text encoded in the barcode can be "previewed" in augmented reality. This provides a step to prevent the disruptive user experience where the camera mode is exited prematurely or suddenly before the user has the opportunity to decide whether to fully view the content referred to by the text.

According to one aspect of the disclosure, constructing the first augment based on the text comprises determining the type of information contained in and/or indicated by the text, selecting a graphics template depending on the type, generating the first augment based on the graphics template and the at least a part of the text. Advantageously, augments with different appearances or abilities for user interaction may be constructed dependent on and tailored to the type of information that the text is indicating. For instance, if the text refers to video content then a video player preview animation may be used as the graphics template for generating the first augment, wherein the preview animation includes frames of the video referred to by text. In another instance, if the text refers to audio content, a music symbol may be used as the graphics template for generating the first augment, wherein the graphics template includes a hyperlink having the text.

According to one aspect of the disclosure, the graphics template may be retrieved from a storage local to the user system. Advantageously, this part of constructing the augment does not have to rely on a connection to a remote storage, and the first augment can be generated locally at the user system. If the content associated with the barcode to be displayed to the user is self-contained in the text encoded by the barcode, the first augment may be generated completely locally at the user system.

According to one aspect of the disclosure, the detecting step detects whether the barcode is present in the image frame from only a portion of the image frame, and the portion of the image frame is determined based on pose parameters and/or locations of position detection patterns of the barcode that are previously determined from an prior image frame captured before the image frame. Advantageously, the speed of the processing of a stream of image frames is increased by reducing the data that the detecting step must process frame after frame.

The disclosure further describes and envisions an augmented reality client of a user system configured to implement one or more of the methods disclosed herein.

The disclosure further describes and envisions a user system comprising, at least, a digital imaging part configured to capture one or more image frames, a processor configured to execute functions of an augmented reality client, and a display part configured to display at least the first augment and/or the second augment overlaying a view of the real world.

The disclosure may also relate to a computer program product, implemented on computer-readable non-transitory storage medium, wherein the computer program product may comprise software code portions configured for, when run on a computer, executing the method steps according to any of the methods described in the present disclosure. The computer program product is preferably implemented at least in part in any of the components the user system, etc.

The disclosure will further be illustrated with reference to the attached drawings, which schematically show embodiments according to the disclosure. It will be understood that the disclosure is not in any way restricted to these specific embodiments. Hereinafter, embodiments of the invention aiming to alleviate the problem(s) described above will be described in further detail. Moreover, combinations of any of the embodiments and limitations are envisioned by the disclosure.

BRIEF DESCRIPTION OF THE DRAWINGS

Aspects of the invention will be explained in greater detail by reference to exemplary embodiments shown in the drawings, in which.

DETAILED DESCRIPTION

Clients, e.g., software running on and/or hardware of a user system, implementing computer vision technologies retrieves and provides information or content to a user simply using image frame(s) captured by a digital imaging part of a user system. These clients detect whether an element in the real world is present in the image frame(s), and retrieve and display information that is contextually salient to the detected element.

Some clients, such as barcode or code scanners, are configured to detect optically machine-readable barcodes. Users can "scan" a barcode using the digital imaging part, and the client is configured to decode the barcode in the image frame captured by the digital imaging part. Barcodes are optically machine-readable symbols configured to embed information or data such as text or a snippet of code. Barcodes may include one-dimensional barcodes. Examples of one-dimensional barcodes include Universal Product Codes (UPC) codes used on products at a supermarket. Barcodes may include two-dimensional barcodes. Examples of two-dimensional barcodes include Quick Response (QR) codes introduced by Denso Wave. In some cases, barcodes may include three-dimensional barcodes.

Figure 1:
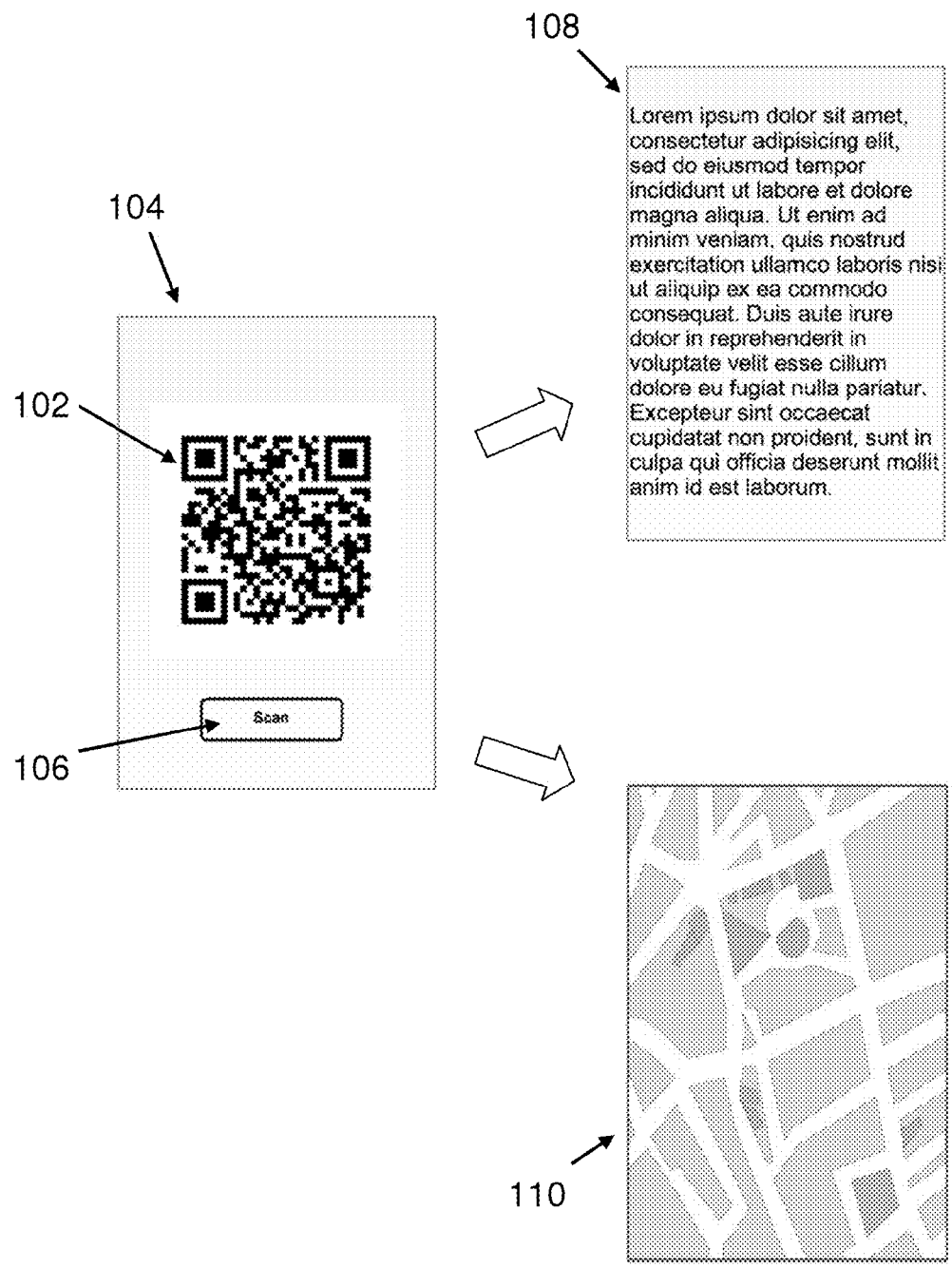
FIG. 1 shows exemplary screenshots of a Quick Response code scanner.
Figure 2:
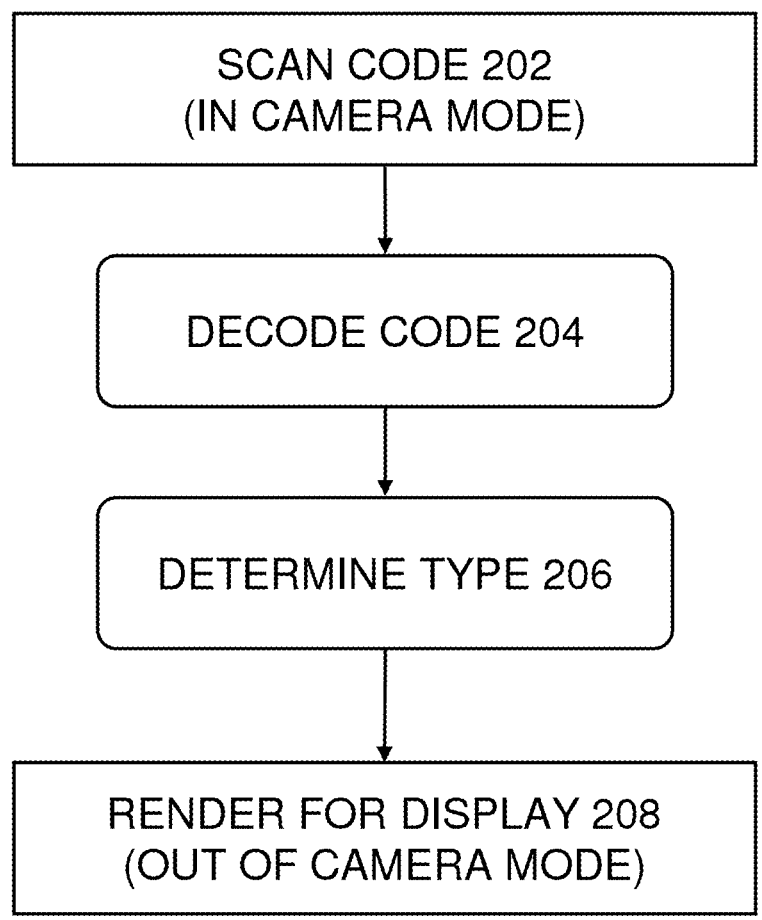
FIG. 2 shows an exemplary flow diagram depicting an illustrative method performed by a Quick Response code scanner.

FIG. 1 shows exemplary screenshots of a Quick Response code scanner, and FIG. 2 shows an exemplary flow diagram depicting an illustrative method performed by the Quick Response code scanner. Quick Response (QR) code scanners are ubiquitous on mobile devices, for quickly scanning a QR code 102 using a camera on the mobile device or any suitable user system (as seen in screenshot 104, and step 202) and decoding the QR code to determine the text embedded in the barcode (step 204). The scanner may show the real world to the user in "camera mode" by rendering a stream of image frames of the real world as captured by the camera for display on a display part of the user system. As the user is directly or indirectly viewing the real world through the display part, the user may direct the camera towards a QR code of interest. For instance, upon pressing the scan button 106, QR code scanner may be configured to retrieve content indicated and/or directed by the text encoded in the QR code, and rendering the content for display on the display screen of the mobile device (as seen in screenshots 108 and 110, and step 208). The mobile device exits "the camera mode" of the QR scanner after scanning and decoding the code, and proceeds (out of camera mode) to render the content for display. When out of camera mode, the stream of image frames of the real world is no longer rendered for display to the user or the user can no longer view the real world. The content is typically displayed substantially full screen on the display part of a user system.

In some embodiments, the QR code scanner determines the type of information (step 206) that is contained in the text encoded by the QR code. Depending on the type of information, the user system may run different types of applications to render the content for display to the user. For instance, the QR code encodes a Uniform Resource Locator (URL). Upon determining that the text comprises a URL, the mobile device exits the camera mode. Then, the mobile device runs a Web browser to retrieve a Web page (or any suitable resource) from a Web server and renders the Web page for display (as seen in screenshot 108). In another instance, the QR code encodes a geographic location such as geocoordinates. Upon determining that the text comprises geographic information, the mobile device exits the camera mode. Then, the mobile device runs a map application to retrieve a map of the area indicated by the geographic location and renders the map of the area for display (as seen in screenshot 110).

Some clients, such as augmented reality clients, are configured to detect target object(s) in the real world using computer vision technology, such as feature-based object recognition and pose estimation. Target objects may be any suitable objects as they are in real life, and (generally) do not encode codes or messages (in contrast from barcodes). A database is maintained of one or more target objects, when applicable, the database maintains reference images of those target objects and/or reference features generated from those reference images. Using the database, one or more target objects may be detected and identified from an image frame (e.g., recognized through object recognition), and accordingly, associated content can be retrieved and rendered for display.

Figure 3:
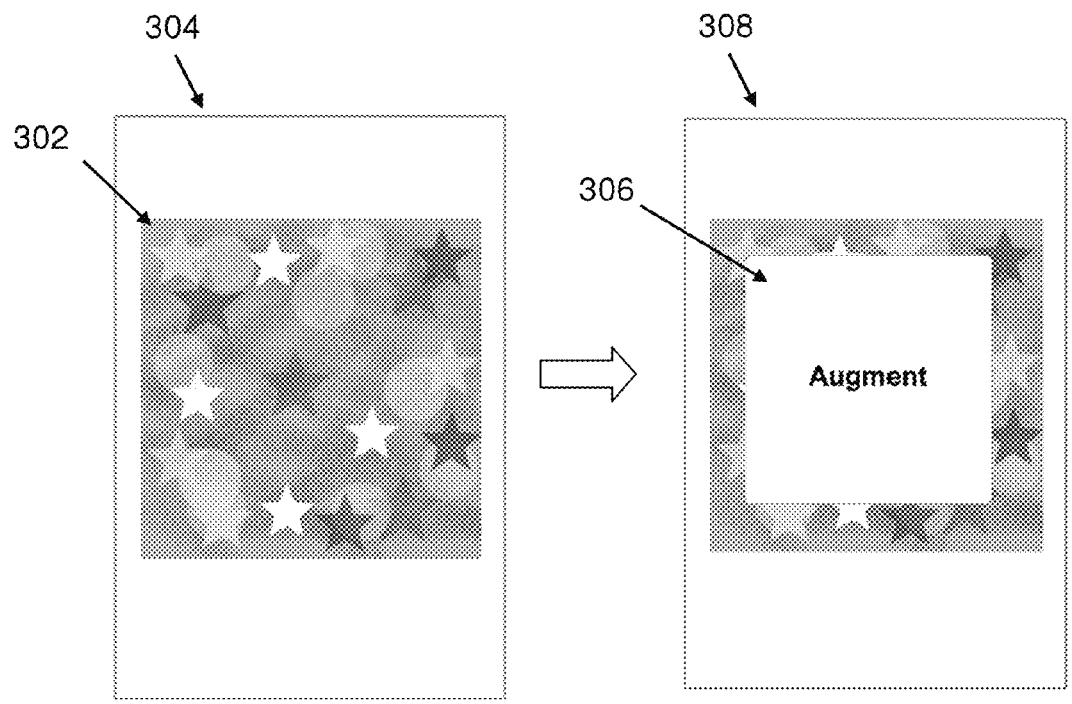
FIG. 3 shows exemplary screenshots of an augmented reality client.
Figure 4:
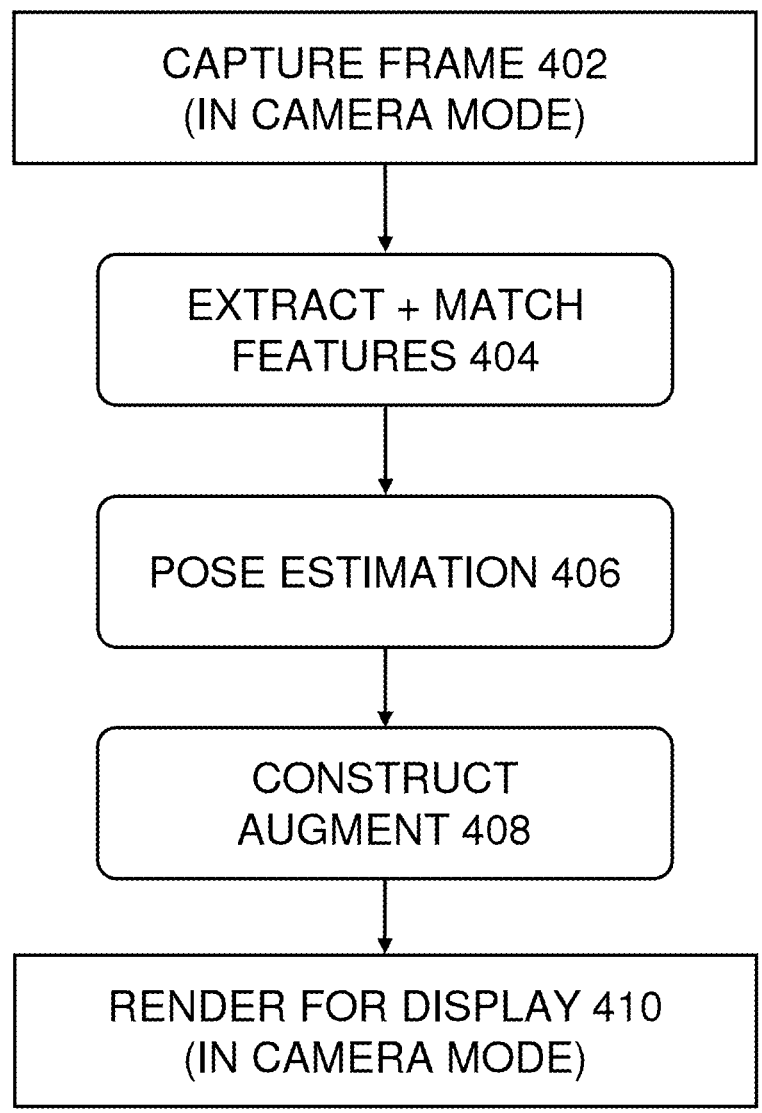
FIG. 4 shows an exemplary flow diagram depicting an illustrative method performed by an augmented reality client.

FIG. 3 shows exemplary screenshots of an augmented reality client. FIG. 4 shows an exemplary flow diagram depicting an illustrative method performed by an augmented reality client;

Augmented reality clients typically allow users to "scan"—in real-time—various objects in the real world as the user is moving around pointing a camera towards different objects in the real world. The augmented reality clients are configured to detect target objects(s), e.g., target object 303 in screenshot 302, and retrieve and provide information or content that is salient to the detected and recognized target object(s). These target objects are not represented by as barcodes. Instead, these target objects are merely represented by the appearance of the target object in the real world, i.e., features of the target object. Examples of target objects include a front cover of a magazine, a photograph, a visual marker that does not encode or embed another code or text, a person, a physical product, etc. While in "camera mode", the user may point the digital imaging part of the user system towards a target object 302 in the real world, as seen in screenshot 304, e.g., where the stream of image frames is rendered for display to the user. The user system captures the image frame (step 402) in camera mode, e.g., as one of the frames in a stream of image frames.

Generally speaking, augmented reality (AR) clients enable users to experience and view the real world that is enhanced by computer-generated sensory output (hereinafter referred to as "an augment" or "augments"). Thus, target objects are preferably real world objects that a user may see in the real world. The sensory output augmenting the real world, generally content that is associated with the target object, may include audio, visual, and/or haptic augments. Visual augments usually comprises computer-generated graphics or virtual content that is overlaid on a view of the real world. Augmented reality is provided live (i.e., in real time) and in particular, in semantic context to elements in the real world. Visual augments, in particular, are rendered to appear in position with, or in the same position as, the target object, and if desired, also to appear with the same pose as the target object. In some embodiments, the visual augments are rendered to appear at a fixed position relative to the target object, thereby having the appearance to the user that the visual augment is "stuck" to the target object. The visual augment thus appears to form an integral part of the target object, even when the target object may be located in different positions within the camera view. As a result, the user experiences and is immersed in a hybrid environment that combines computer-generated augments and the real world.

For instance, an augmented reality client may apply computer vision techniques to image frames captured by a camera detect target objects in the real world. The user system extracts features from the image frame, and matches the extracted features against the reference features in the database (step 404). Then, the augmented reality client may render salient augments in real-time as a user is moving around in the real world. The user system estimates the pose parameters of the target object in the image frame (step 406) to determine the position and the pose of the target object. An augment, e.g., a visual augment, is constructed using content that is associated with the target object (step 408), wherein the content is retrievable based on the identity of the target object detected from the image frame. The augment is then generated for display to the user in camera mode (step 410) using the pose parameters, e.g., as seen as augment 306 in screenshot 308. In the context of this disclosure, pose parameters of a target object comprises information which specifies the position and, if applicable, pose of the target object. By rendering the augment to appear in position with, and if desired, in the same pose as, the target object using the pose parameters, the user is provided with an augmented reality experience which combines the computer generated augments with the real world as the user moves about the real world.

Conventional clients, as explained above, thus behave differently and provide different user experiences when scanning barcodes versus scanning target objects. When a barcode is scanned and detected by the client, the user is taken out of "camera mode" to view the associated content for the barcode. When a target object is scanned and detected by the client, the user remains in "camera mode" to view the associated content. The two different behaviors when combined in a single client, create a user experience that may be unnatural and disruptive for a user. When scanning both barcodes and target objects, either one after another or both together in the same image frame, the user may be, perhaps unexpectedly, taken out of camera mode to view the associated content. The usability issue is exacerbated if the user is using augmented reality goggles, and the associated content of the barcode is displayed in full view and thus inconveniently and perhaps dangerously obstructs the user's view on the real world.

It was discovered by the inventors that users using an augmented reality client attempts to scan both barcodes and target objects indiscriminately. One possible explanation for such user behavior is that users do not understand that target objects and QR codes are processed differently by conventional clients. Furthermore, the users may not understand that the conventional clients behave and respond to target objects and QR codes differently. From the discovery, the inventors realized that users could expect the client to provide associated content for the barcode and the target object in the same way. The inconsistent behaviors provided in response to target objects and barcodes thus causes user frustration.

Disclosed herein is an improved method for providing content associated with barcodes in augmented reality in addition or in combination with providing content associated with target objects in augmented reality. The improved method advantageously provides a augmented reality client that a user may use to view the respective content associated with barcodes and target objects while in camera view to improve usability. Advantageously, the user is not unexpectedly taken out of camera view to view the content associated with the barcode and the user experience provided is consistent between barcodes and target objects. Furthermore, the improved method integrates barcodes and a visualization of the barcode within augmented reality, without disrupting the real-time augmented reality experience.

Generally, the user may experience augmented reality directly, e.g., through goggles, glasses, or other projection-based augmented reality systems. In some cases, the user may experience augmented reality indirectly, e.g., through a display part of a handheld device. Examples of such handheld devices include mobile phones or tablets with a digital computer display and a digital imaging part. The display part thus displays the augment(s) overlaid on the real world—the image frames captured by the digital imaging part. Thus, the display part displays a computer-generated augmented reality view composing the augment(s) and the image frames).

An augmented reality client preferably renders augments to appear in position with the object or element of interest to a user. In the context of this disclosure, when an augment is in position with the object or element of interest, it is rendered for display to appear in the same location and preferably with the same pose as the object or element of interest. One common technique for rendering an augment in position with the object or element comprises determining the pose parameters of detected objects or element(s) in the real world and rendering the augments based on the pose parameters. Using this technique, an augment is displayed and overlaid onto a corresponding element of the real world as if the augment is stuck to the element (or is positioned next to the element) or appears to be stuck to the element. When the pose parameters of the corresponding element are updated from one image frame to another image frame, the augment remains to appear stuck to the element even as the user is moving around the real world (i.e., the digital imaging part is moving and/or pointing to different directions).

Figure 5:
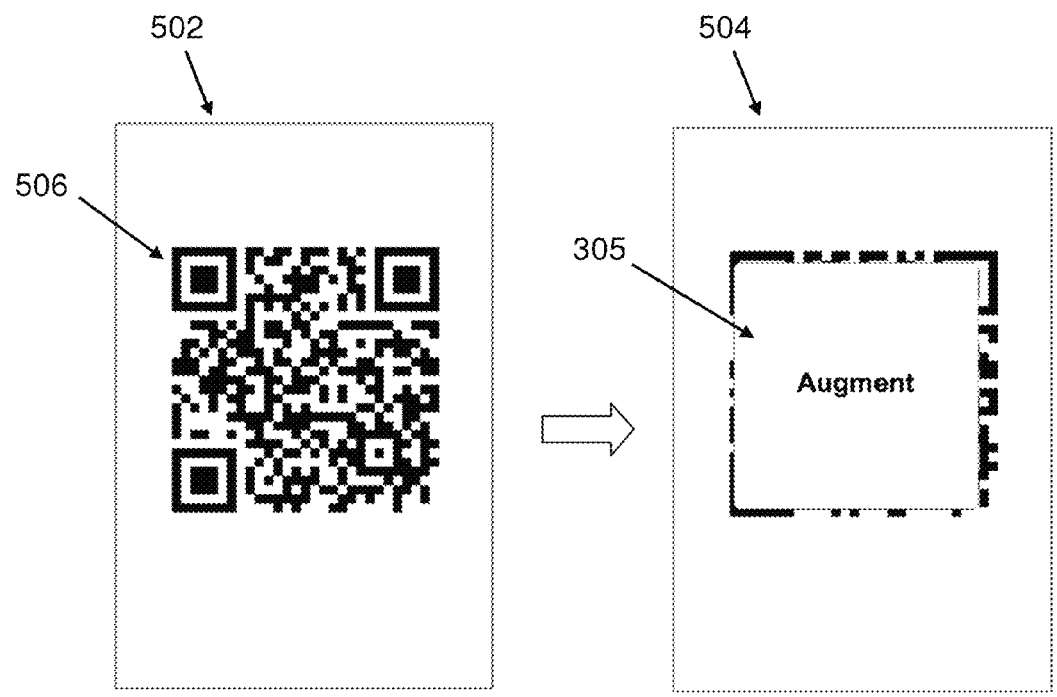
FIG. 5 shows exemplary screenshots of an augmented reality client for visualizing text encoded in an optically machine-readable barcode to a user in augmented reality, according to an embodiment of the disclosure.

FIG. 5 shows exemplary screenshots of an augmented reality client for visualizing text encoded in an optically machine-readable barcode to a user in augmented reality, according to an embodiment of the disclosure. Rather than applying the method shown in FIG. 2 where the user device exits "the camera mode" to view the content indicated or directed by the text encoded in the bar code, the barcode is visualized in augmented reality without exiting "the camera mode".

The improved method is configured to provide visualization of the barcode, more specifically, the text encoded in an optically machine-readable barcode, to a user in augmented reality. A user system is provided with an augmented reality client to provide the augmented reality experience. Specifically, the user system is configured to render at least one augment for display to the user, wherein the at least one augment overlays a view of the real world. In particular, the augment is rendered for display in position with the barcode in camera view. The augment, when displayed, may in some embodiments appears to lay on top of the barcode, or overlays the barcode. The augment is constructed based on the barcode.

For illustration, a use case is shown in screenshots 502 and 504. A user, while in "camera mode" (e.g., where the display shows a live feed of image frames captured by the digital imaging part of the user system), points the camera to a barcode (e.g., a QR code 506). Screenshot 502 illustrates that the user system (e.g., a mobile device) shows that the barcode is in view. In response to detecting and decoding the barcode, an augment is constructed and rendered for display without exiting "camera mode". Screenshot 504 illustrates that the display shows an augment appearing in the display, preferably in position, with the barcode in "camera mode" (e.g., where the display now show a live feed of the image frames and augment(s)). As a result, a visualization of the barcode having content associated with the barcode is provided as part of the augmented reality experience, where the augment is preferably overlaid over the barcode in "camera mode". Exemplary augments are illustrated in FIGS. 7A-I.

Figure 6:
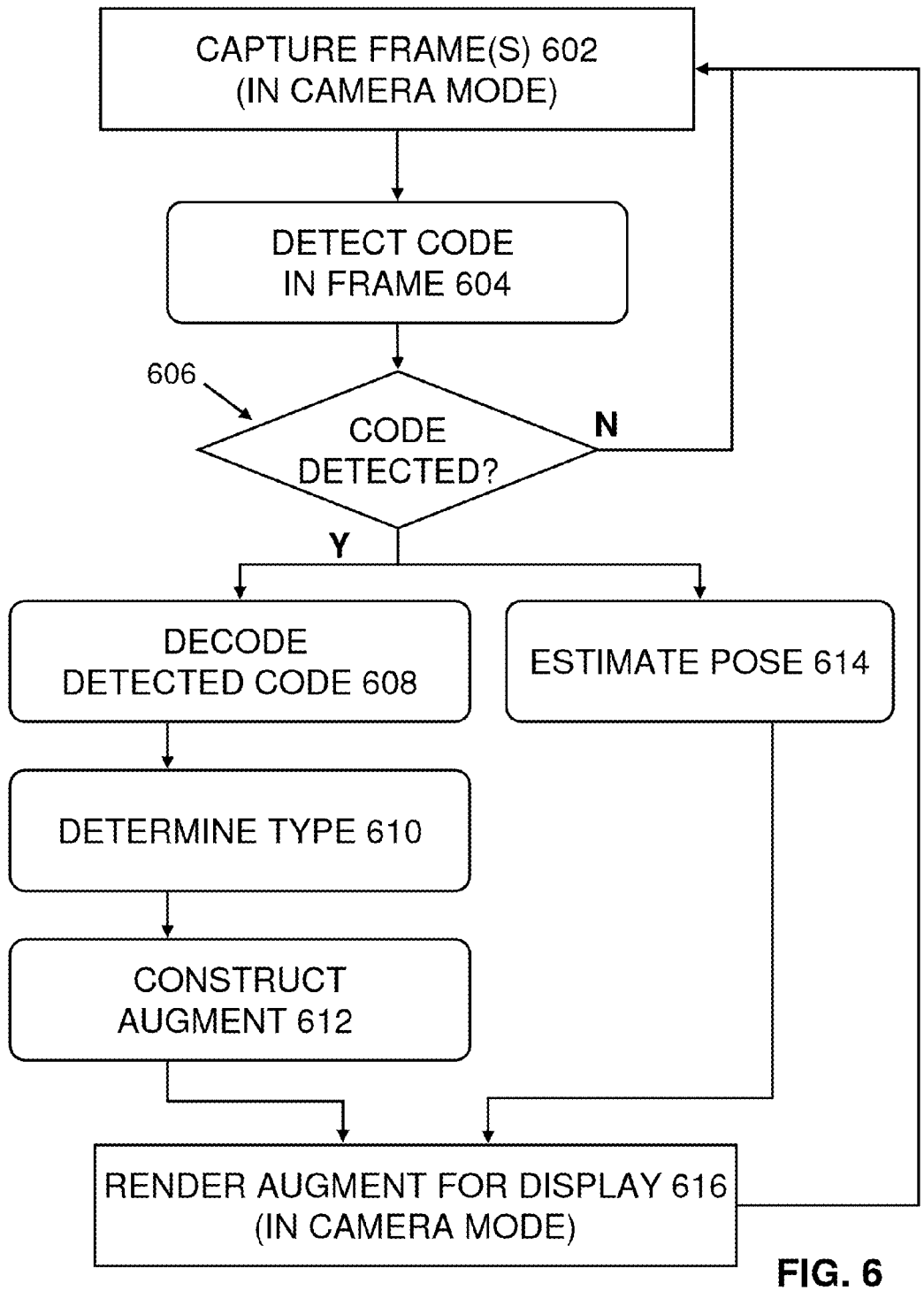
FIG. 6 shows an exemplary flow diagram depicting an illustrative method performed by an improved augmented reality client, according to an embodiment of the disclosure.
Figure 7A:
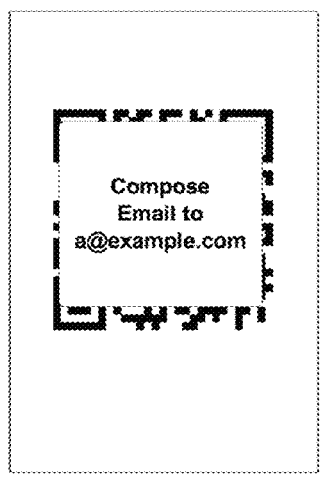
FIGS. 7A-I show exemplary screenshots depicting illustrative augments for visualizing text encoded in an optically machine-readable barcode to a user in augmented reality, according to several embodiments of the disclosure.
Figure 7B:
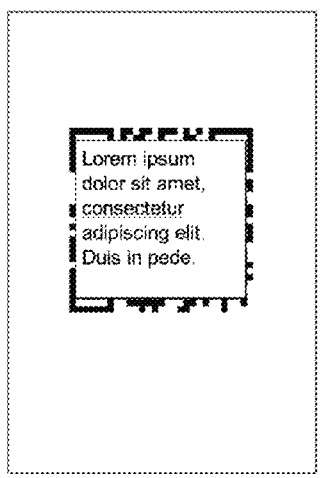
Figure 7C:
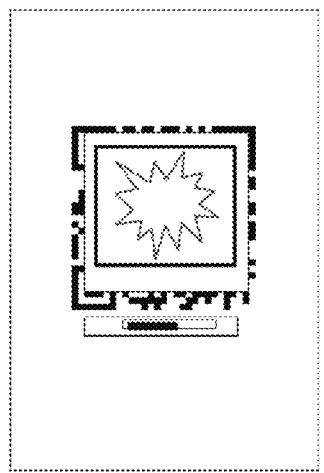
Figure 7D:
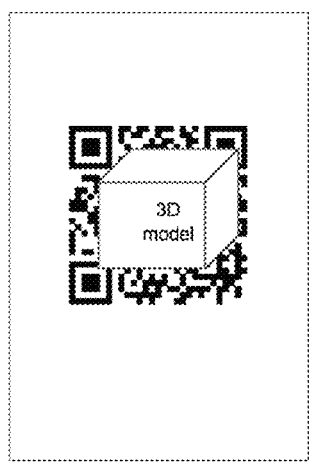
Figure 7E:
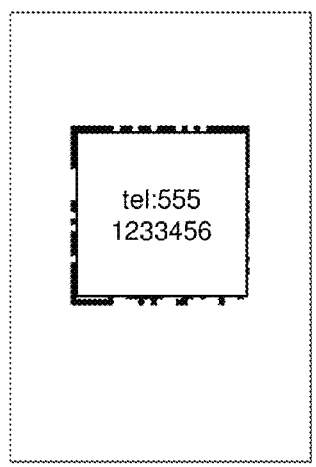
Figure 7F:
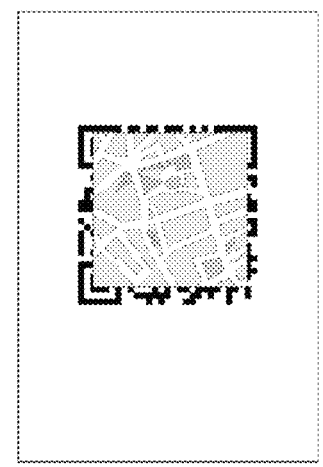
Figure 7G:
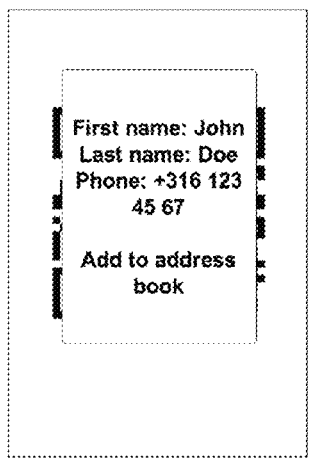
Figure 7H:
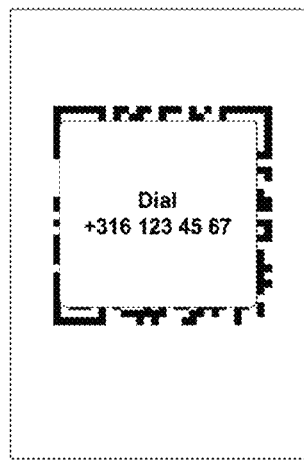
Figure 7I:
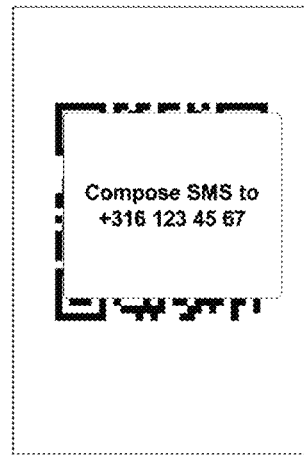

FIG. 6 shows an exemplary flow diagram depicting an illustrative method performed by an improved augmented reality client, according to an embodiment of the disclosure. The method comprises receiving an image frame captured by a digital imaging part of the user system while in camera mode (step 602) and detecting, from the image frame, whether the barcode is present in the image frame (step 604).

For instance, a digital imaging part of the user system, e.g., a camera of a user device is configured to capture a stream of video frames or a plurality of (sequential) image frames of the real world. A user device, in particular, an augmented reality client, is configured to apply computer vision techniques on the image data in an image frame to detect whether a barcode is present in the image frame.

Step 604, the detection step, preferably differs from the method used by conventional barcode scanners (e.g., QR code scanners), by detecting from only a portion of the image frame, whether the barcode is present in the image frame. Conventional barcode scanners prompt a user to capture a single image frame for processing (as illustrated in screenshot 104 in FIG. 1 by a user interface element "scan"). However, in augmented reality, barcodes are detected from a stream of image frames. In contrast to some conventional barcode scanners where a single image frame is analyzed, step 404 in augmented reality is configured to analyze a live stream of images frames in a time critical environment. Since processing time required by typical barcode detection algorithms is proportional to input image size in pixels, it is preferable to restrict the input to step 604 to only a portion of the image frame. Knowing that the stream of image frames is continuous and a last known barcode position determined from previously processed image frames(s), step 604 may assume that, in current (presently processing) image frame, the barcode is within a search range from the last known barcode position. Based on this assumption, step 604 is preferably configured to dynamically adjust which portion of the image frame is processed for detecting the barcode.

In some embodiments, the portion of the image frame is determined based on pose parameters of the barcode and/or locations of position detection patterns (both of which are explained in further detail below) that are previously determined from a prior image frame captured before the image frame. Margins of a predefined size/width may be added to the bounding rectangle of last known barcode location to obtain a crop rectangle (other shapes may be used depending on the type of barcode). The crop rectangle is then used to crop the whole image frame to obtain the portion of the image frame. The crop rectangle may be saved in a storage part of the user device as a reference for future (to-be-processed) image frames. If a barcode was not detected in the previous frame, the reference crop rectangle may be enlarged so that the boundaries of the reference crop rectangle become closer to the boundaries of the whole image frame image boundaries by a predefined step value. In some embodiments, the boundaries of the reference crop rectangle become the boundaries of the whole image. Accordingly, crop rectangle is restricted to the input camera image boundaries and may vary from one image frame to the next. In the worst case, the whole image frame is used.

The image frame or a portion of the image frame is provided as input to a binarization algorithm to detect whether a barcode is present in the image frame. The goal of binarization algorithm is to produce a binarized image of the same size, but with each pixel represented by either black or white color. One possible binarization algorithm is an "hybrid binarization" algorithm implementation provided by zxing library ("Zebra Crossing", a Multi-format 1D/2D barcode image processing library with clients for Android, Java, hosted at http://code.google.com/p/zxing/ as of the filing of this patent application). This algorithm is optimized to give best results for barcodes. The binarized image serves as an input to a pattern finder algorithm, such as the pattern finder algorithm provided by the zxing library. The pattern finder algorithm determines locations of position detection patterns and alignment pattern. The algorithm scans through the pixels of the binarized image and check whether sequences of black and white pixels represents a pattern of interest (i.e., determines whether a position detection pattern is present). Such an algorithm may be implemented in check 606 for determining whether a barcode has been detected. For detecting a QR code, a QR code is said to be detected by the pattern finder algorithm if three position detection patterns are found (corresponding to the three standardized corners of the QR code).

The method is advantageously configured to detect more than one barcode that is present in the image frame. Locations of the position detection patterns (and if applicable, an alignment pattern) for each detected barcode is propagated to the next flow steps.

If a barcode is detected (see the "Y" arrows), the method proceeds to decode the detected barcode (step 608) and estimate the pose parameters of the barcode (step 614). If a barcode is not detected (see the "N" arrow), the method returns to step 602 and repeats the step 604 and check 606 for the next image frame in the stream.

To decode the detected barcode (step 608) to determine, e.g., which text is encoded, a suitable pattern finder algorithm also determines the number of pixels in the input image that represent a single module of the barcode (e.g., a QR code). Knowing the locations of position detection patterns and the number of pixels that represent a single module, the algorithm calculates size of scanned barcode in modules. Knowing the size of the barcode in modules and locations of position detection patterns (and alignment pattern, if one was found) in the image frame, the algorithm is able to compute a geometric transformation needed to map locations of pixels in the image frame to location of modules of the barcode. Scanning pixels of the original image frame again and applying calculated transform to their locations, the algorithm is configured to determine the binary values encoded in each module of the barcode. The binary values encoded in the barcode enables, e.g., a text to be decoded from the barcode. The binary values may be stored in a two dimensional bit matrix, e.g., in a storage part of the user system. Locations of position detection patterns and, if found, alignment pattern in the input image and the corresponding bit matrix representation of barcode may be saved in a storage part of the user system as a result of this step. The bit matrix is provided into a suitable barcode decoding algorithm that generates plain text representation of the information encoded in the barcode. The decoding algorithm may perform error checking and correction to ensure decoding went correctly. The text decoded from the barcode is also saved in a storage part of the user system.

For tracking detected barcodes (and its text encoded in the barcode) from one image frame to the next, the decoded plain text may be passed through a hash function to generate target identifier. The target identifiers may be stored in a storage part of the user system to uniquely identify and track detected barcodes and enable a suitable augment to be constructed and displayed.

If the barcodes contain different types of information, an optional step 610 may be implemented to determine the type of information contained in and/or indicated by the text decoded from the barcode. The different types of information include at least one of the following: contact information, calendar event information, electronic mail (e-mail) address, telephone number, uniform resource locator (URL), various content formats (e.g., the text includes ".mp3" file extension for audio content, or the text includes ".mp4" file extension for video content), geographical location, network identifier, Short Message Service (SMS) messaging information. The different types of information contained in or indicated by the text may affect the construction of an augment for the barcode.

In step 612, the augmented reality client constructs an augment based on at least a part of the text. In the context of the disclosure, an augment is defined as a virtual or a computer-generated object suitable to be rendered for display such that the object appears overlaid onto the real world. The constructed augment is stored in a storage part of the user system and may be associated with the tracking identifier of the corresponding barcode. The augment(s) constructed in step 612 may be anchored to one or more barcodes detected in the image frame, using the target identifiers, and the augments are saved to a list of augments as an output (i.e., to input for step 616). Although the disclosure describes an illustrative embodiment where a single augment is constructed, constructing more than one augment (i.e., more than one computer-generated graphics object) for a barcode is also envisioned. In some embodiments, an augment may include a plurality of sub-augments (e.g., more than one computer-generated graphics object which form the augment.

An example of an augment may be a user interface object that a user may interact with in augmented reality. An augment may visually indicate to a user an action that is performable by the user system based on the text. For instance, an augment may be a button to send an email to an email address in the text encoded by the bar code. The augmented reality client may be configured to receive user input, while the user is in augmented reality (or "camera mode"), through an input part of the user system to interact with the augment. For instance, a user may tap on the touchscreen at location where the augment is rendered to indicate a desire for the user device to perform the action (e.g., to open an email application and compose an email to the email address). In response to the user input, the augmented reality client or the user system may execute the action on the user system on the basis of the text embedded in the barcode. Such an augment advantageously allows a user to visualize and interact with barcodes in augmented reality. If the user is using an augmented reality client that is configured to also detect target objects that are not barcodes, such an augment conveniently allows the user to visualize the barcode without exiting "camera mode" to switch to another client, thereby reducing any disruption that it would have caused to the user. Furthermore, such visualization enables a user to preview the barcode before making a decision to exit "camera mode".

In some embodiments, an augment may be generated to include a graphics template and optionally at least a part of the text encoded by the barcode. The information in the augment can be self contained in the text that is encoded by the barcode. Such an augment is advantageously generated completely locally without access to a remote storage, by generating the graphics template locally at the user system or retrieving the graphics template from a storage that is local to the user system. For instance, if the text includes a telephone number, and the augment is a virtual object which displays the telephone number in a graphics template and a user interface button, such an augment can be generated completely locally at the user system.

In some embodiments, an augment may include a graphics template, and (visual) information/content that is indicated and/or directed by the text encoded in the barcode. For instance, constructing the augment may include retrieving visual content indicated and/or directed by the text, and generating the augment based on at least a part of the visual content. Some of the information in an augment (e.g., the visual content) can be constructed from resources stored in a remote storage (no longer self contained). In such cases, the construction of such augment may comprise retrieval of resources from a remote storage. For instance, if the text includes a URL to a Web page, and the augment is a virtual object which shows a preview of the Web page, such an augment may be generated by at least retrieving the Web page from a remote server. In another instance, the virtual objet may display the title of the Web page, wherein the augment is generated by retrieving a first part of the web page (e.g., if it's an HTML page, the first part of the page is the HEAD of the page). Advantageously, the user may view the title of the Webpage in augmented reality and decide whether or not to view the entire page based on the title (which is much easier to read than the URL, or in some cases, the preview of the Webpage).

In some embodiments, a part of the text may be extracted from the text to construct an augment. For instance, the text may include a telephone number in a particular syntax, and the digits of the telephone number are extracted and the augment is constructed to include the extracted telephone number.

In some embodiments, the type of information that the text contains (as determined from optional step 610) may affect the augment that is constructed in step 612. Depending on the type of information an augment of specific type is generated, a graphics template for constructing the augment associated with a particular type of information contained in the text may be selected. The particulars of a graphics template are flexible and are dependent on the desired implementation of the improved method. The selection of the graphics template based on the type of information is also dependent on the desired implementation and results. In some embodiments, if the type of information encoded in the barcode cannot be determined, an augment with a plain text preview of the text encoded in the barcode is generated. The augment may include a graphics template configured to render the plain text for display to the user.

In step 614, which may be performed in parallel or in series with one or more of steps 608, 610, and 612, the pose parameters (i.e., which indicates the position and/or the pose of the barcode in the image frame) is estimated. For illustration, pose estimation for a QR code is explained. Locations of finder patterns (position detection patterns and alignment pattern) in a QR code are specified by the QR code standard (in coordinates given in QR code modules). Using the locations of finder patters, the method is able to obtain pose parameters from the location of each finder pattern in camera image (i.e., an output of the algorithm used in step 408). Given this list of correspondences between finder pattern locations in the QR code itself and finder pattern locations in the camera image, step 614 may estimate the pose parameters of the barcode with respect to the device, given the intrinsic camera parameters. For instance, step 614 may fit a model of the barcode to the observed data, e.g., by function optimization. Estimated pose parameters associated with the detected barcodes (e.g., using the target identifiers for the barcodes) are then saved in a storage of the user device and provided as an input to step 616.

If a barcode is detected (and if applicable, and pose parameters are successfully estimated), an augment constructed from step 612 is rendered for display in augmented reality based on the pose parameters of the detected barcode estimated in step 614. Accordingly, the augment appears stuck to the barcode in augmented reality, and the visualization of the barcode is provided to the user.

Advantageously, the pose parameters and augments are compatible with an augmented reality client that is suitable for "scanning" target objects which are not barcodes (e.g., an augmented reality client that uses feature-based tracking). The simultaneous/compatible processes for processing both barcodes and target objects and generating augments for both barcodes and target objects are described in further detail in FIG. 9. The pose parameters and augment(s) for barcodes may be stored intermixed with the augments and poses from feature-tracked targets. Existing algorithms used in computer graphics computer graphics may be used to display all augments to appear overlaid on top of camera image and in position with the barcode(s) and/or tracked objects.

The method then returns to step 602 for the next image frame.

FIGS. 7A-I show exemplary screenshots depicting illustrative augments for visualizing text encoded in an optically machine-readable barcode to a user in augmented reality. The augment might be represented visually by:
(illustrated by FIGS. 7A, 7H, and 7I) a button with a call to action for the user (e.g. "Compose e-mail to aaa@bbb.com", "Add XXX to your address book");
(illustrated by FIG. 7B) a web page preview for the URL encoded in the scanned QR code;

(illustrated by FIG. 7C) a video player view that plays video specified by URL encoded in the scanned QR code directly in AR;

(illustrated by FIG. 7D) a 3D model that is downloaded from a URL encoded in the QR code;

(illustrated by FIG. 7E) a plain text preview panel, that shows text decoded from the scanned QR code;

(illustrated by FIG. 7F) a preview of the geographical map showing the location encoded in the QR code; and (illustrated by FIG. 7G) a preview of contact details that are encoded in the QR code.

The augment may include a user input listener configured to be triggered by user input. In response to user input, the user system may execute an appropriate action. For instance, an appropriate action is triggered when the user taps the augment on his device screen.

For instance, if the text comprises a URL, the graphics template may comprise a user interface element where a preview of the Web page (or any visual information/content) indicated by the URL can be rendered for display. The augment may comprise a user input listener for responding to user input (e.g., a tap gesture) for opening a browser to view the Web page indicated by the URL.

In another instance, if the text comprises a URL to a video resource hosted on a Web site, the graphics template may comprise a video player where a preview of the video indicated by the URL can be rendered for display.

In another instance, if the text comprises a URL to an audio resource hosted on a Web site, the graphics template may comprise an icon or an audio button. The constructed augment may include a user input listener for responding to user input to open an audio player to play the audio resource at the URL.

In another instance, if the text comprises a URL to a video resource hosted on a Web site, the graphics template may comprise an icon or a play video button. The constructed augment may include a user input listener for responding to user input to open a video player to play the video resource at the URL.

In another instance, if the text comprises a telephone number, the graphics template may comprise a telephone icon or a call button, and optionally a space for displaying the telephone number. The constructed augment may include a user input listener for responding to user input to dial the telephone number using the user system.

In another instance, if the text comprises a telephone number and SMS text, the graphics template may comprise a message icon or an SMS button, and optionally a space for displaying the telephone number and/or the SMS text. The constructed augment may include a user input listener for responding to user input to open a default messaging application on the user system to transmit an SMS using the SMS text to the telephone number.

In another instance, if the text comprises contact information, the graphics template may comprise an address book icon or a contacts button, and optionally a space for displaying the contact information (or a part of the contact information). The constructed augment may include a user input listener for responding to user input to open add the contact information to the user system.

In another instance, if the text comprises geographical location, the graphics template may comprise an map icon or a maps button, and optionally a space for displaying the geographical location (e.g., geocoordinates). The constructed augment may include a user input listener for responding to user input to open a maps application to view the map of the area at the geographical location.

In another instance, if the text comprises geographical location, the graphics template may comprise user interface element where a map of the area may be rendered for display. The construction of the augment thus includes retrieving the map of the area to be used for the user interface element. The constructed augment may include a user input listener for responding to user input to open a maps application to view the map of the area at the geographical location (e.g., in more detail and with the features of the maps application).

In another instance, if the text comprises an e-mail address, the graphics template may comprise an envelope/letter icon or an e-mail button, and optionally a space for displaying the email address. The constructed augment may include a user input listener for responding to user input to compose an email to the e-mail address using the user system.

In another instance, if the text comprises an e-mail address and e-mail text, the graphics template may comprise a envelop/letter icon or an e-mail button, and optionally a space for displaying the e-mail address and/or the email text. The constructed augment may include a user input listener for responding to user input to compose and/or send an email to the e-mail address with the e-mail text using the user system.

Figure 8:
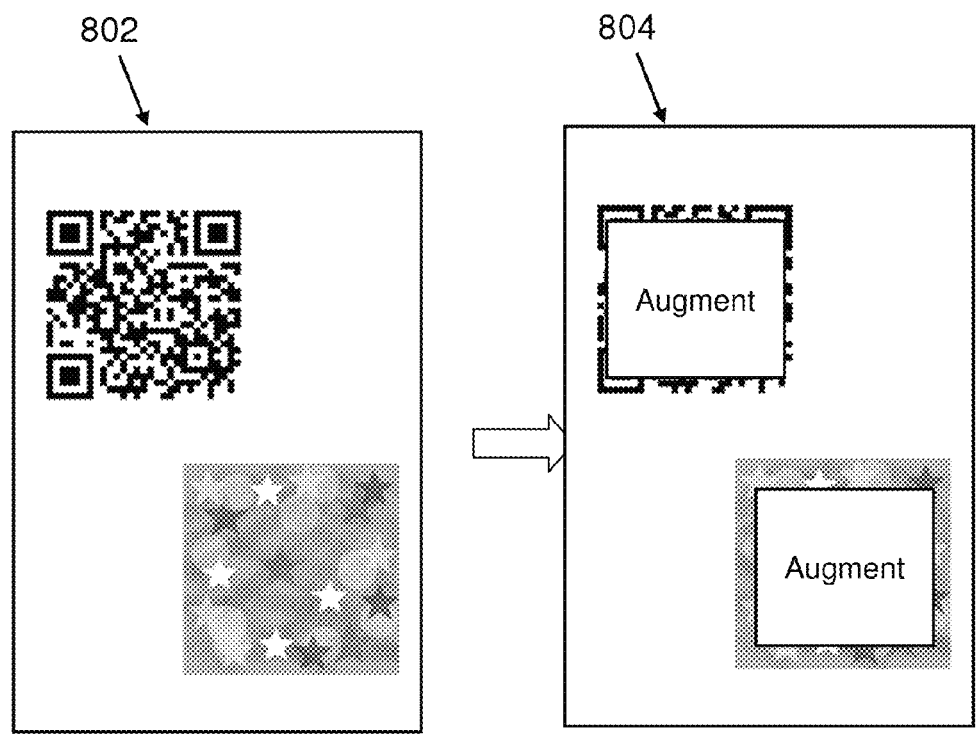
FIG. 8 show exemplary screenshots depicting a consistent user experience for processing barcodes and target objects, according to an embodiment of the disclosure.

FIG. 8 show exemplary screenshots depicting a consistent user experience for processing barcodes and target objects, according to an embodiment of the disclosure. The improved method prevents a user from exiting "camera mode" when a barcode is detected. Furthermore, when both a barcode and a target object are in the image frame (as seen in screenshot 802), both the barcode and the target object are detected, e.g., through the parallel processes shown in FIG. 9. Accordingly, an augment associated with the barcode and an augment associated with the target object are both rendered for display to the user. Both augments are rendered for display to appear in (a fixed) position with (and optionally overlaying) the barcode and the target object respectively. Such an improved method provides a user system which behaves consistently when providing associated content for barcodes and target objects.

Figure 9:
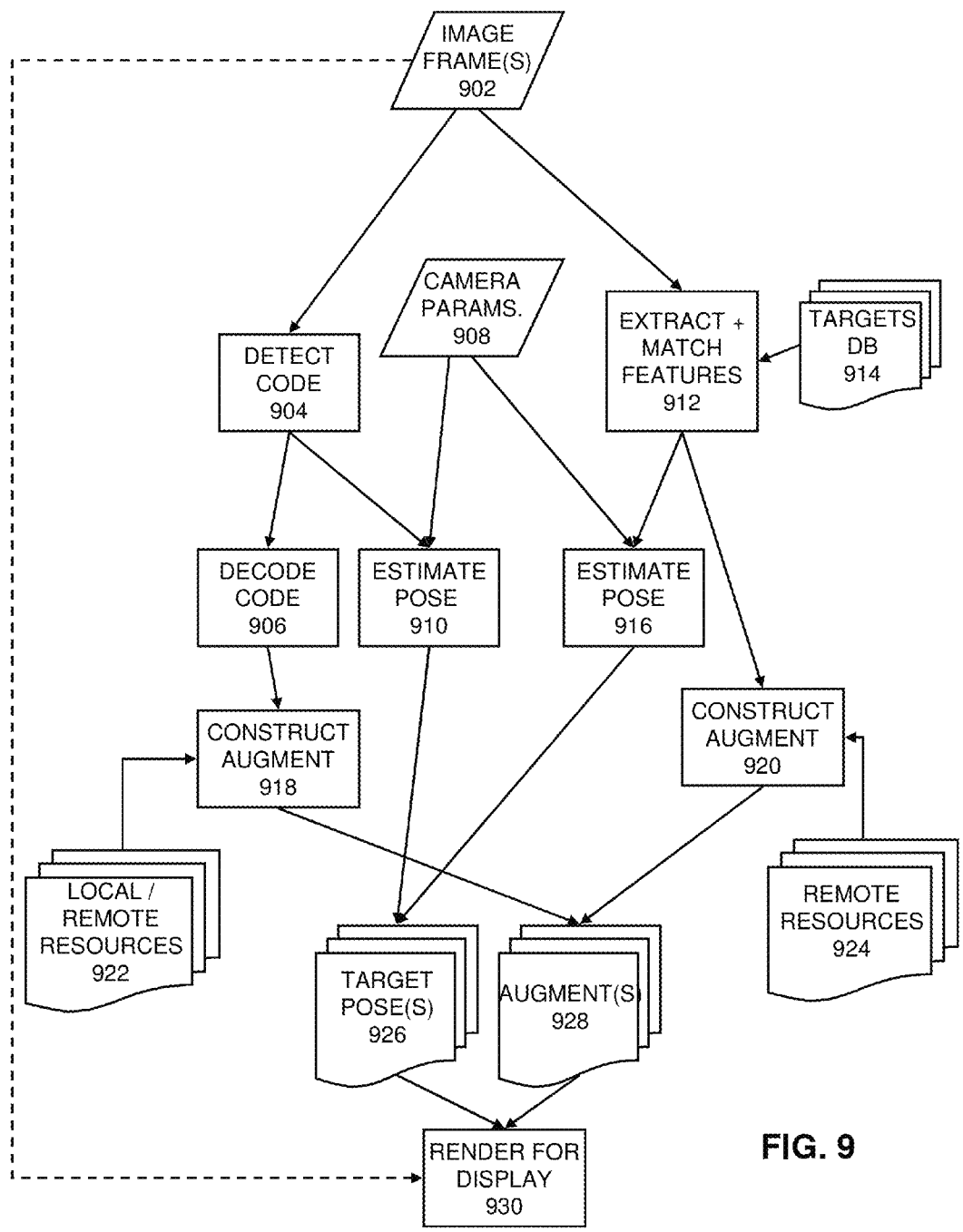
FIG. 9 shows an exemplary flow diagram depicting an illustrative method performed by an improved augmented reality client, according to an embodiment of the disclosure.

FIG. 9 shows an exemplary flow diagram depicting an illustrative method performed by an improved augmented reality client, according to an embodiment of the disclosure. The improved method, having dual processes (e.g., the process illustrated on the left hand side and the process illustrated on the right hand side of the figure) advantageously allows users to scan barcodes and target objects. If other types of objects or elements of the real world (not barcodes and not feature-based target objects) are to be scanned, further processes may be added to the system design. The design of the system is provided such that barcode detection and pose estimation may be done in parallel with feature-based target object detection and pose estimation. In some embodiments, the processes may be turned on or off, or adjusted programmatically. The parallel design of the system not only enables a user to use one augmented reality client to process both barcodes and target objects, subsystems (e.g., the subsystem used for rendering augment(s) for display) may be reused and applied to both barcodes and target objects.

The image frame(s) 902 in the stream of image frames may be provided to parallel processes which detect barcodes and target objects.

Barcodes are detected through step 904 (which corresponds to step 604 in FIG. 6). Once a barcode is detected, the output of step 904 is (in parallel) used to decode the barcode at step 906 (which corresponds to step 608 and optionally step 610 in FIG. 6) and to estimate the pose parameters of the barcode at step 910 (which corresponds to step 608 in FIG. 6). Pose estimation in steps 910 may utilize camera parameters 908. The detected barcode(s) may be provided with a target identifier or any other suitable identifying information for the barcode such that the detected barcode may be tracked from one frame to the next, and may be used to associate the detected barcode with the corresponding augment. The output of step 906 is then provided as input to construct a corresponding augment (step 918, which corresponds to step 612 and optionally step 610 of FIG. 6). The constructed augment is stored as augments 928, and may be associated with a corresponding target identifier of the detected barcode. Because a barcode encodes information (e.g., text or a snippet of code), an augment may be constructed completely locally (i.e., from only local resources 922) or may be constructed from local and remote resources 922.

The method, through step 912, detects from the same image frame 902 whether a target object is present in the image frame (target object not being a barcode), by extracting query features from the image frame and matching the extracted features with reference features of (known, reference) target objects (corresponding to step 404 in FIG. 4). Query features are suitable for object recognition and/or pose estimation. Furthermore, reference features, generated from a reference image of a target object, are also suitable for object recognition and/or pose estimation. If the query features are a match with a set of reference features associated with a particular target object, it is said that the particular target object is detected in the image frame (i.e., the target object is present in the image frame). Reference features may be accessed from a targets database 914.

A target identifier for the detected target object may be attributed and stored for tracking the detected target object from one frame to the next. The target identifier typically comprises identifying information of the target object which matches the query features. The identifying information and/or the target identifier may be used for the construction/retrieval of a corresponding augment.

Once a target object is detected, the output of step 912 (e.g., correspondences between query features and the matching set of reference features) is used to estimate the pose parameters (step 916). Pose estimation in step 616 may utilize camera parameters 908 (corresponding to step 406 in FIG. 4). Accordingly the pose parameters of the target object are estimated from the query features and the reference features. The estimated pose parameters may be stored as target poses 926, and may be associated with a corresponding target identifier of the detected target object. In some embodiments, a target identifier is only attributed if the pose estimate step has been successful.

The output of step 912 (and optionally the output from step 916), preferably identifying information of the detected target object (e.g., the target identifier), is provided to construct a corresponding augment at step 920 (corresponding to step 408 of FIG. 4). To construct a corresponding augment, the target identifier is used to retrieve a corresponding augment from remote resource 924. For instance, the target identifier may be used as a query to retrieve a corresponding augment or part of an augment for step 620 from a server remote from the user system.

The resulting target pose(s) 926 and the constructed augment(s) 928 from both processes may then be used to render the augments for display to the user at step 930. If the user is experiencing indirect augmented reality, the image frame 902 may optionally be used for overlaying the augment(s) over a view of the real world.

Figure 10:
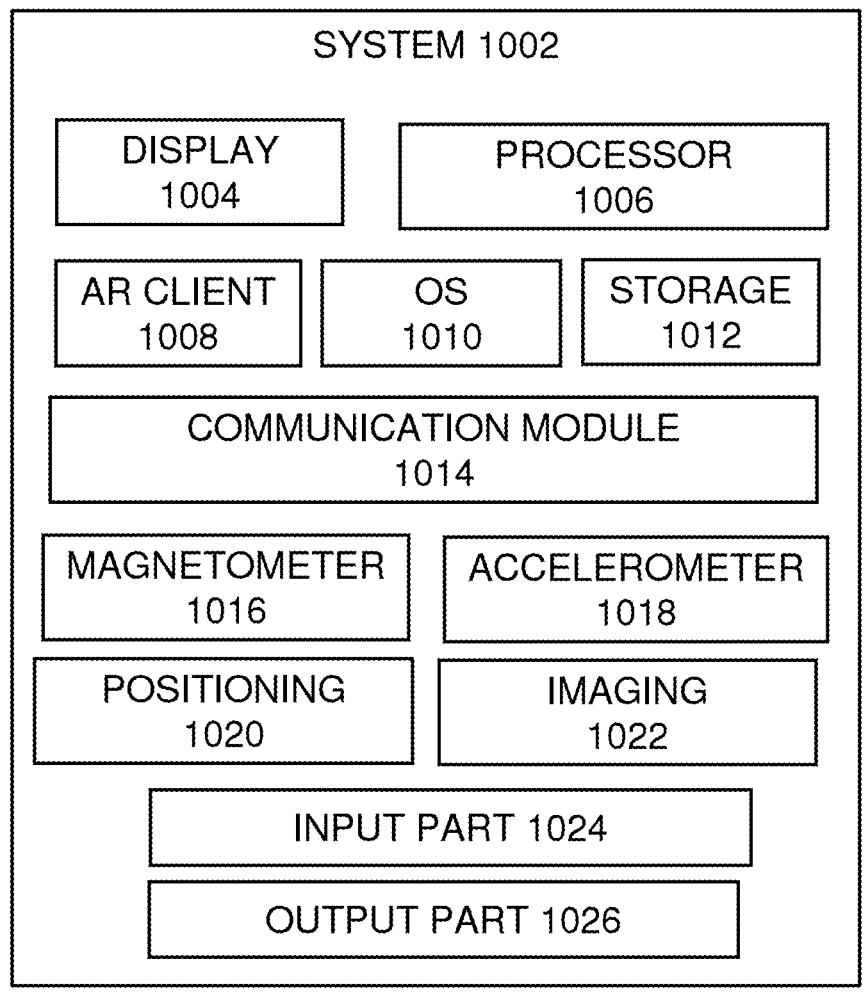
FIG. 10 shows an exemplary user system, according to an embodiment of the disclosure.

FIG. 10 shows an illustrative user system according to one embodiment of the disclosure. Exemplary user system 1002 includes a display part 1004, a processor 1006, an augmented reality (AR) client 1008, an operating system 1010, a storage part 1012, a communication module 1014, a magnetometer 1016, an accelerometer 1018, a positioning module 1020, a digital imaging part 1022, a user input part 1024, and an output part 1026.

The display part, if indirect augmented reality is provided, is preferably a capacitive touch-sensitive display screen having a substantially flat surface allowing the user to view content in a two-dimensional plane. Naturally, other types of touch screens may also be used. If direct augmented reality is provided, the display part may also be projection based (e.g., projection glasses). The display part may be a suitable output device for presentation of information in visual form. When the input information is supplied as an electrical signal, the display is called an electronic display. Common examples for electronic visual displays are televisions, computer monitors, screens on a mobile device, etc. In some embodiments, a display for a spatial augmented reality system may be a projection of visual information onto real world objects. In some other embodiments, a display part for a head-mounted augmented reality system may be optically projected into the eyes of a user through a virtual retinal display. The display part may be combined with the user input part to provide a touch-sensitive display.

The processor is provided to support the computations required for the methods and systems described herein. The processor may be a semiconductor device configured to perform computations required for carrying the functions of user system. For example, the processor includes a computer processing unit or a microprocessor. In some embodiments, the processor includes a graphics processing unit specialized for rendering and generating computer-generated graphics. Preferably, the processor is configured to communicate, e.g., via a communication bus, with other components of user system. In this manner, the processor may execute processes using data from other components of user system, such as the storage part.

An implementation of AR client may be a software package installed or configured to run on user system. The implementation of AR client is preferably a computer program product, stored in non-transitory storage medium, when executed on the processor, is configured to provide an augmented reality experience to the user. For instance, the implementation of AR client provides "a camera mode" where a user may view the real world through the display part, whereby the process combines an optically acquired image from the digital imaging part and computer-generated augments to generate the augmented reality camera view.

The operating system enables the AR client to communicate with other parts of the user system (such as access to data in the storage part). User system may use the communication module to communicate local and/or remote resources (as shown in FIG. 6), or any necessary resources for constructing augments. The operating system may be configured to manage processes running on the processor, as well as facilitate data coming to and from various components of user system. The storage part may be any physical, non-transitory storage medium configured to store data for the user system. For example, the storage part may store program code and/or values that are accessible by the operating system running on the processor. Images captured by the digital imaging part may be stored in the storage part as part of a camera buffer. Other data such as tracking identifiers, tracked poses, and augments, may also be stored in the storage part and may be accessible by the AR client.

The magnetometer, the accelerometer, the positioning module are examples of sensors which may be used to offer sensor data regarding the physical state of user system and the environment surrounding user system. Sensor data may be used to enhance the augments constructed by the user system and/or the augmented reality experience. The magnetometer (also referred to as magneto-resistive compass or electronic/digital compass) may be a electronic device configured to measure the magnetic field of the Earth, such that a compass reading may be determined. For instance, a mobile phone may include a built in digital compass for determining the compass heading of the user system. In some embodiments, user system may include a (e.g., 3-axis) gyroscope, (not shown), to measure tilt in addition to direction heading. Other sensors may include proximity and light sensors. The accelerometer may assist the user system in estimating the movement or displacement of the user system. For instance, the accelerometer may assist in measuring the distance traveled by user system to improve processes involving detection and/or pose estimation. The accelerometer may be used as means of user input for interacting with the augment(s), such as means for detecting a shaking or toss motion applied to the user system. The accelerometer may also be used to determine the orientation of the user system, such as whether it is being held in portrait mode or landscape mode (i.e., for an elongated device). Data from the accelerometer may be provided to the AR client such that the graphical user interface(s) displayed may be configured according to accelerometer readings. For instance, a graphical user interface (e.g., such as the layout of the graphical user interface) may be generated differently depending on whether the user is holding a mobile phone (i.e., AR device) in portrait mode or landscape mode. In another instance, a graphical user interface may be dynamically generated based at least in part on the tilt measured by the accelerometer (i.e., for determining device orientation), such that three-dimensional graphics may be rendered differently based on the tilt readings (e.g., for a motion sensitive augmented reality game). In some cases, tilt readings may be determined based on data from at least one of: the accelerometer and a gyroscope. The positioning device is configured to estimate the physical position of the user system within a reference system. For instance, the positioning device may be part of a global positioning system, configured to provide an estimate of the longitude and latitude reading of user system.

The digital imaging part is configured to capture image frames of the real world and provides a live stream of image frames to which the AR client has access. The AR client running on user system is configured to render augments for display in "camera mode" by displaying a graphical overlay comprising of augment(s) in the display part over the live stream of image frames from the digital imaging part. The generation of graphical overlay may be performed by an AR engine in the AR client.

A user may then utilize the user input part to interact with augments or other graphical user interface elements provided by the user system. The user input part may include a keypad, touch screen, microphone, mouse, keyboard, tactile glove, motion sensor or motion sensitive camera, light-sensitive device, camera, or any suitable user input devices. In some embodiments, the digital imaging device may be used as part of the user input part based on computer vision (e.g., capabilities to detect hand gestures). The output part may include other output such as audio output, haptic output (e.g., vibration), or any other suitable sensory output.

With some modifications, one skilled in the art may extend the embodiments described herein to other architectures, networks, or technologies. For instance, barcodes generated using any suitable methods is envisioned by the disclosure, so long as the barcode is suitable to be detected in an image frame and the pose parameters of the barcode can be estimated from the image frame. Barcodes may be one-dimensional barcode or a two-dimensional barcode, or a three-dimensional barcode. Common barcodes include a Quick Response (QR) code or a matrix barcode.

Various embodiments of the invention may be implemented as a program product for use with a computer system or a processor, where the program(s) of the program product define functions of the embodiments (including the methods described herein). In one embodiment, the program(s) can be contained on a variety of non-transitory computer-readable storage media (generally referred to as "storage" or "storage part"), where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

The invention claimed is:

1. A method for providing visualization of text encoded in an optically machine-readable barcode to a user in augmented reality, said augmented reality provided by a user system comprising a computer having a digital imaging part and a display part, configured to render at least one augment for display, said at least one augment overlaying a view of the real world, the method comprising:

receiving an image frame captured by the digital imaging part of the user system;

detecting, from the image frame, using the computer, both the barcode and a target object present in the image frame, the target object not being a barcode;

while remaining in camera mode, rendering a first augment associated with the barcode for display using the display part of the user system based on first pose parameters of the barcode, wherein, when the first augment is displayed to a user, the first augment appears in position with the barcode, wherein the first augment is based on text encoded in the barcode;

from the same image frame, estimating second pose parameters of the target object on the basis of features extracted from the image frame and reference features of the target object and rendering a second augment associated with the target object for display using the display part of the user system, the rendering of the second augment being based on the estimated second pose parameters of the target object, wherein, when the second augment is displayed to the user, the second augment appears in position with the target object, thereby providing consistent camera mode operation for both detection of the barcode and the target object.

2. The method according to claim 1, further comprising: responsive to the barcode being detected:
- decoding the barcode to determine text embedded in the barcode;
- constructing the first augment based on at least part of the text;
- estimating, from the image frame, the first pose parameters of the barcode.

3. The method according to claim 2, wherein the first augment visually indicates an action performable by the user system based on the text.

4. The method according to claim 3, further comprising: receiving user input through an input part of the user system indicating a desire to perform the action;
executing the action on the user system based on the text.

5. The method according to claim 2, wherein the first augment comprises at least a part of visual content indicated and/or directed by the text.

6. The method according to claim 2, wherein constructing the first augment based on the text comprises:
- retrieving visual content indicated and/or directed by the text;
- generating the first augment based on at least a part of the visual content.

7. The method according to claim 2, wherein constructing the first augment based on the text comprises:
- determining a type of information contained in and/or indicated by the text; selecting a graphics template depending on the type of information;
- generating the first augment based on the graphics template and the at least a part of the text.

8. The method according to claim 7, wherein the graphics template is retrieved from a storage local to the user system, and the first augment is generated locally at the user system.

9. The method according to claim 7, wherein the type of information comprises at least one of the following: contact information, calendar event information, electronic mail (e-mail) address, telephone number, uniform resource locator (URL), information having a particular content format, geographical location, network identifier, Short Message Service (SMS) messaging information.

10. The method according to claim 1, wherein detecting whether the target object is present comprises:
- extracting query features from the image frame, said query features suitable for object recognition and/or pose estimation;
- determining whether the query features matches reference features of the target object, said reference features suitable for object recognition and/or pose estimation.

11. The method according to claim 10, further comprising: responsive to the target object being detected:
- constructing the second augment, said second augment associated with the target object;
- estimating, from the query features and the reference features, the second pose parameters of the target object.

12. The method according to claim 1, wherein the barcode comprises a one-dimensional barcode or a two-dimensional barcode, or a three-dimensional barcode.

13. The method according to claim 1, wherein the barcode comprises a Quick Response (QR) code or a matrix barcode.

14. The method according to claim 1, wherein detecting whether the barcode is present in the image frame detects whether the barcode is present in the image frame from only a portion of the image frame, and the portion of the image frame is determined based on pose parameters and/or locations of position detection patterns of the barcode that are previously determined from a prior image frame captured before the image frame.

15. An augmented reality client of a user system having a processor, a digital imaging part, and a display part operably connected to the processor, the augmented reality client configured to provide visualization of text encoded in an optically machine-readable barcode to a user in augmented reality, said augmented reality provided by a user system configured to render at least one augments for display, said at least one augments overlaying a view of the real world, the augmented reality client, operable with the processor, configured to:
- receive an image frame captured by the digital imaging part of the user system;
- detect, from the image frame, both the barcode and a target object present in the image frame, the target object not being a barcode;
- while remaining in camera mode, render a first augment associated with the barcode for display using the display part of the user system based on first pose parameters of the barcode, wherein, when the first augment is displayed to a user, the first augment appears in position with the barcode, wherein the first augment is based on text encoded in the barcode;
- from the same image frame, estimate second pose parameters of the target object on the basis of features extracted from the image frame and reference features of the target object and render a second augment associated with the target object for display using the display part of the user system, the rendering being based on the second pose parameters of the target object, wherein, when the second augment is displayed to the user, the second augment appears in position with the target object, thereby providing consistent camera mode operation for both detection of the barcode and the target object.

16. The augmented reality client according to claim 15 is further configured to:
after the barcode is detected:
- decode the barcode to determine the text embedded in the barcode;
- construct the first augment based on at least part of the text.

17. The augmented reality client according to claim 15 is further configured to:
- determine the type of information contained in the text;
- select a graphics template depending on the type;
- generate the first augment based on the graphics template and the at least a part of the text.

18. The augmented reality client according to claim 17, wherein the graphics template is retrieved from a storage local to the user system, and the first augment is generated completely locally at the user system.

19. A user system comprising:
- a digital imaging part configured to capture one or more image frames;
- a display part configured to display at least a first augment and/or a second augment overlaying a view of the real world; and a processor operably connected to the digital imaging part and to the display part, the processor configured to provide visualization of text encoded in an optically machine-readable barcode to a user in augmented reality, said augmented reality provided by a user system configured to render at least one augments for display, said at least one augments overlaying a view of the real world, the processor configured to:

receive an image frame captured by the digital imaging part of the user system;

detect, from the image frame, both the barcode and a target object present in the image frame, the target object not being a barcode;

while remaining in camera mode, render a first augment associated with the barcode for display using the display part of the user system based on first pose parameters of the barcode, wherein, when the first augment is displayed to a user, the first augment appears in position with the barcode, wherein the first augment is based on text encoded in the barcode;

from the same image frame, estimate second pose parameters of the target object on the basis of features extracted from the image frame and reference features of the target object and render a second augment associated with the target object for display using the display part of the user system, the rendering being based on the second pose parameters of the target object, wherein, when the second augment is displayed to the user, the second augment appears in position with the target object, thereby providing consistent camera mode operation for both detection of the barcode and the target object.

20. The user system of claim 19, wherein the processor is further configured to, when a barcode is detected, estimate first pose parameters of the barcode on the basis of the orientation of at least part of the detected barcode within the image frame, and to determine a first augment by decoding at least part of the detected barcode.

* * * * *